Nov. 18, 1924.
J. V. POWELL
1,516,244
VELOCIPEDE
Filed Oct. 25, 1922
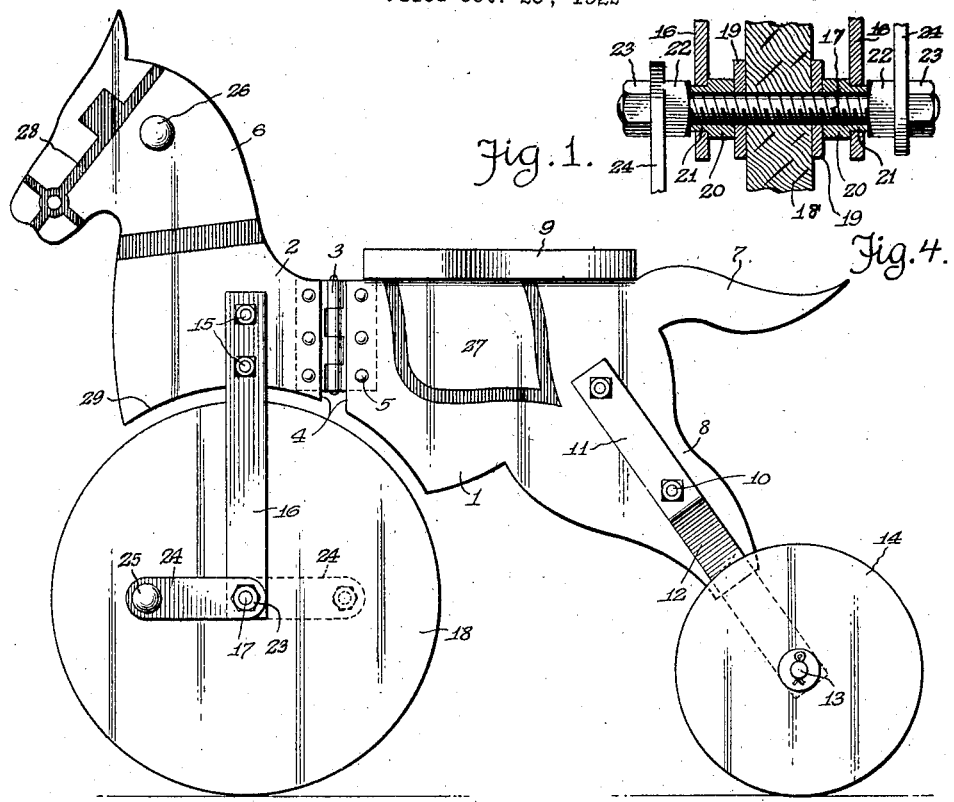
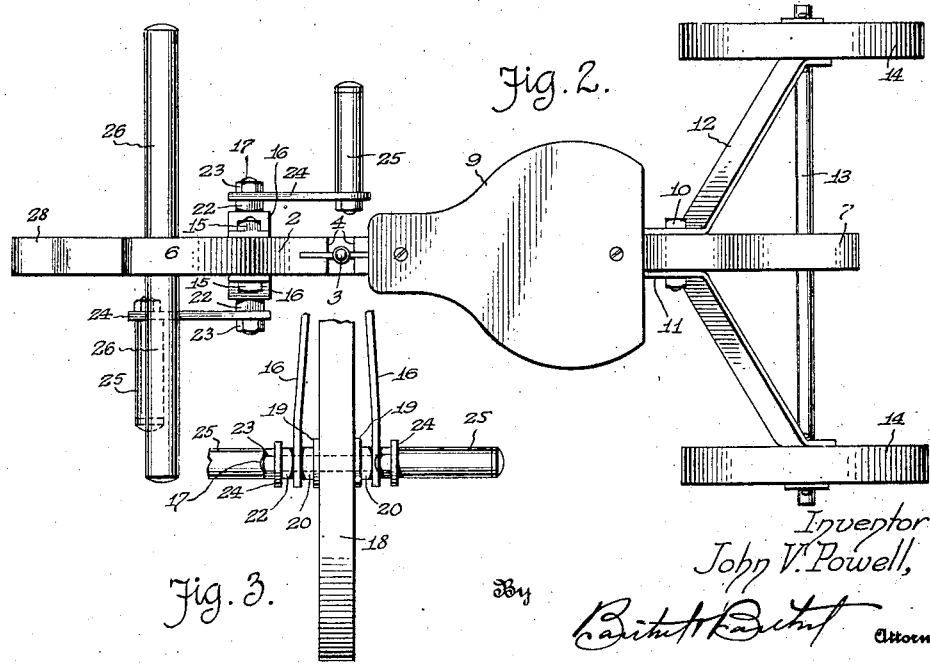
Inventor
John V. Powell,
By
Attorneys Patented Nov. 18, 1924.

1,516,244

UNITED STATES PATENT OFFICE.

JOHN V. POWELL, OF DETROIT, MICHIGAN.

VELOCIPEDE.

Application filed October 25, 1922. Serial No. 596,735.

*To all whom it may concern:*

Be it known that I, JOHN V. POWELL, a citizen of the United States of America, residing at Detroit, in the county of Wayne and State of Michigan, have invented certain new and useful Improvements in Velocipedes, of which the following is a specification, reference being had therein to the accompanying drawings.

This invention relates to a velocipede and one of the objects of my invention is to provied a three-wheeled vehicle that may be ridden, steered and propelled by a child, the velocipede having a body portion representing an animal with the hind quarters supported by two wheels and the front quarters hingedly connected to the hind quarters and supported by a single pedal driven steering wheel. With the body of the velocipede representing a horse or other animal it will afford considerable amusement to juveniles and the head of the horse or animal may be used for steering by the occupant of the velocipede.

A further object of this invention is to provide a simple, strong and inexpensive wheeled toy that may be safely used by juveniles and the simple construction entering into the wheeled toy will be hereinafter described and then clamed.

Reference will now be had to the drawing, wherein—

Figure 1 is a side elevation of the velocipede;

Fig. 2 is a plan of the same;

Fig. 3 is a front elevation of a portion of a velocipede showing a steerable wheel, and Fig. 4 is a detail sectional view of the axle of the steerable wheel.

The velocipede comprises a two-part body having a rear part 1 and a front part 2, said parts being hingedly connected together by a vertically disposed hinge or pivotal connection 3 which has its articulated members fixed in parallel confronting walls 4 of the body parts 1 and 2 by transversely disposed rivets 5 or other fastening means. The hinge or pivotal connection 3 permits of the front part 2 being swung relative to the vertical plane of the rear part 1.

The body parts 1 and 2 are preferably made of wood, for instance, from a flat thick board sawed or otherwise cut to represent the outline of a horse or other animal, the body part 2 having a head 6 and the body part 1, a tail piece 7, a leg piece 8 and a saddle or seat 9.

Attached to opposite sides of the leg piece 8 by nut equipped bolts 10 are the upper ends 11 of diverging legs or axle members 12 made of metal, having the lower ends thereof either loosely or fixedly mounted on an axle 13 which is provided with wheels 14 made of wood. The wheels 14 may be either fixed, or mounted to rotate, on the ends of the axle 13, depending on whether the latter is loosely or fixedly mounted in the lower ends of the legs 12. In either instance the wheels are separated sufficiently to prevent sidewise tilting of the velocipede.

Attached to the sides of the front body part 2, by nut equipped bolts 15, are the upper ends of fork members 16 which cooperate in providing a vertical disposed fork, supported from an axle 17 mounted in a front steering wheel 18. The axle 17 is fixed relative to the wheel 18 by washers 19 and nuts 20, said nuts being screwed on the axle 17 with cylindrical portions 21 of said nuts extending into openings provided therefor in the lower ends of the fork members 16. Loosely retaining the fork members 16 on the cylindrical portions 21 of the nuts 20 are inner nuts 22 which cooperate with outer nuts 23 in fixing the inner ends of cranks 24 on the ends of the axle 17. The cranks 24 extend in opposite directions and have the outer ends thereof provided with laterally extending rotatable pedals or foot pieces 25.

The body portion 2 being hinged to the body part 1 permits of the head 6 being used for steering purposes, and extending transversely of the head 6 is a handle bar 26.

The seat 9 is in the form of a flat board suitably secured to the upper straight edge of the body part 1, and said body part, as well as the front part 2, may be finished to represent a saddle blanket 27, a bridle 28 or any other equipment.

The body parts 1 and 2 are undercut, as at 29, so that the steerable wheel 18 may at all times remain in the vertical plane of the body part 2 and at times be in the plane of the body part 1, which is true when the velocipede is being operated in a straight direction.

One embodiment of my invention has been illustrated, but it is to be understood that the structural elements are susceptible to such changes, in size, shape and manner of assembling, as fall within the scope of the appended claim.

What I claim is :—

A velocipede comprising front and rear body parts, a hinge having its leaves mounted in said body parts and hingedly connecting said parts together, a seat fixed on the upper edge of the rear body part, diverging leg members attached to and extending below the rear body part, a wheel supported axle supporting said leg members, fork members attached to said front body part well in advance of said hinge, an axle journaled in said fork members, a wheel on said axle with the greater part of said wheel under the front body part and said front body part extending forwardly of said axle, nuts fixing said wheel on said axle and having cylindrical portions journaled in said fork members, and pedals supported from the ends of said axle.

In testimony whereof I affix my signature in presence of two witnesses.

JOHN V. POWELL.

Witnesses:
KARL H. BUTLER,
ANNA M. DORR.